Figure 3:
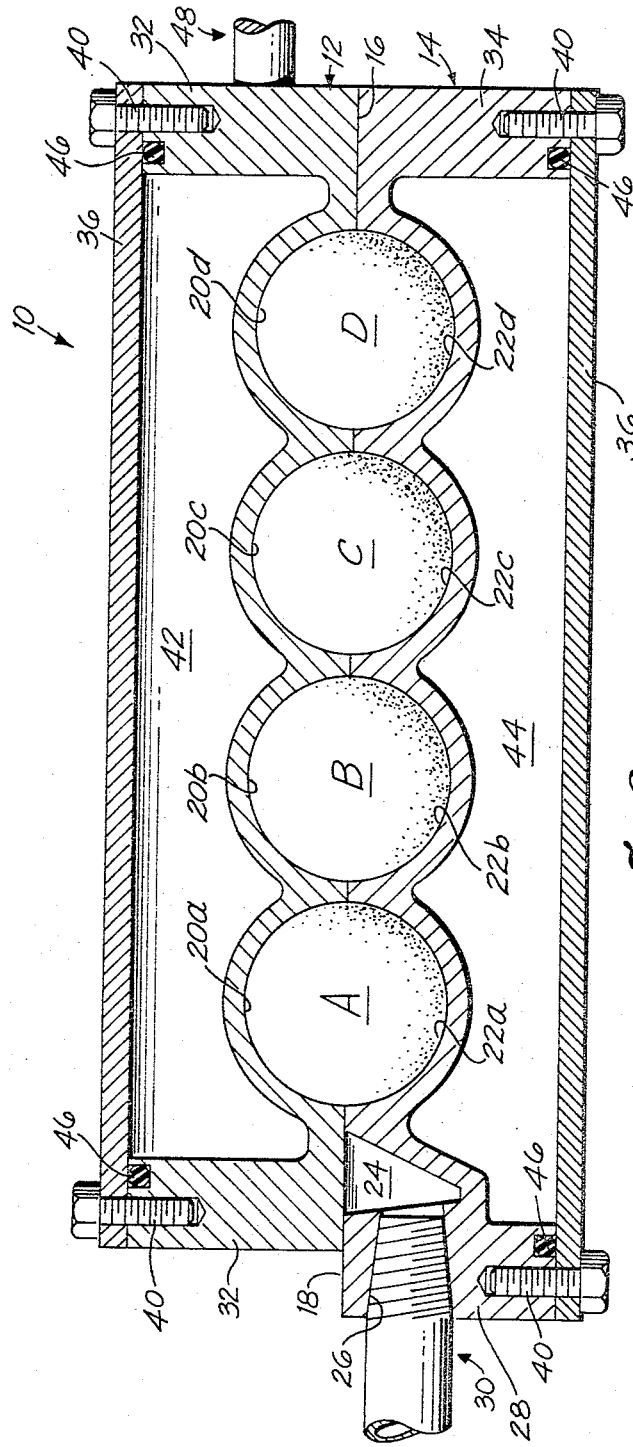

July 11, 1967   S. SZELWACH   3,330,005
MULTIPLE CAVITY FOAM MOLDING APPARATUS
Filed Aug. 12, 1963   2 Sheets-Sheet 1
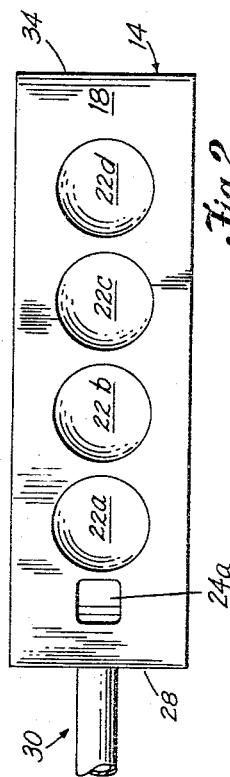
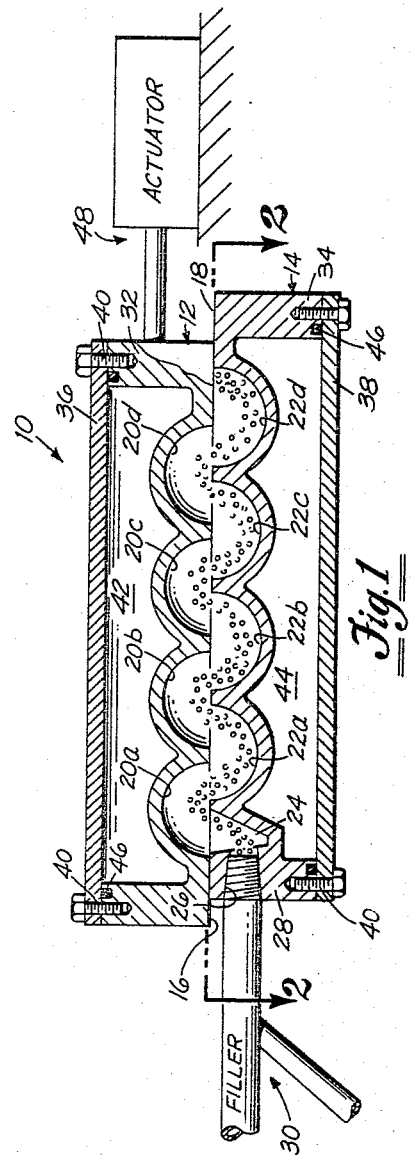
STANLEY SZELWACH
INVENTOR.
BY
*Francis N. Massello*
ATTORNEY

United States Patent Office 3,330,005
Patented July 11, 1967

3,330,005
MULTIPLE CAVITY FOAM MOLDING
APPARATUS
Stanley Szelwach, Upper Saddle River, N.J.
(1640 Stewart Ave., New Hyde Park, N.Y. 11040)
Filed Aug. 12, 1963, Ser. No. 301,315
9 Claims. (Cl. 18—42)

This invention relates to methods and apparatus for molding and, particularly, for molding objects from expandable plastic beads, a technique which is referred to in the art, and hereinafter, as "foam molding."

In recent years there has been a remarkable growth of interest in, and development of techniques and equipment for, foam molding. The variety of articles made in this manner has experienced a similar expansion, now ranging from ice buckets to display window mannequins. However, for reasons hereinafter set forth, foam molding heretofore has not been adaptable to the economical, large-volume production of small objects including many articles which, except for certain limitations of the foam molding technique, to be pointed out presently, cannot be produced satisfactorily in any other known manner.

For example, market conditions make it increasingly difficult, if not impossible, for domestic producers to manufacture hollow glass Christmas tree ornaments of conventional construction in competition with imported ornaments. An ideal alternative would be to substitute a foam molded plastic sphere which, due to its extreme lightness of weight and smooth exterior, is practically indistinguishable from a blown glass ball when similarly decorated and would have the considerable advantage of being far less frangible. However, to be competitive with imported blown glass counterparts, it would be necessary to produce unblemished spheres in large volume and at very low cost. This is but one example of the importance of adapting foam molding to low cost, high-volume production of small shapes; it is this importance which has spurred efforts to find a solution to the problems outlined below but, to date, with little practical success.

At this juncture, a brief summary of the foam molding process would appear to be in order as an aid to understanding of both the problems extant in the prior art and the present invention. The technique involves the use of molding material consisting of tiny plastic particles, referred to in the art as "beads." The beads commercially used and available at the present time are formed of polystyrene plastic although other plastics undoubtedly would serve as well. In its original form, the plastic is granular, having a particle size reminiscent of ordinary granulated sugar. Each individual granule contains a "foaming" or expanding agent, usually one of the more volatile hydrocarbons such as pentane ($C_5H_{12}$).

The plastic granules are pre-expanded under carefully controlled conditions to about from 5 to 40 times their original volume. At this stage they take on the appearance of spherical beads, being some 0.1 inch in diameter on the average. The individual beads contain a substantial residual amount of the expanding agent for further expansion during the actual molding phase.

The bulk density of the pre-expanded bead material is quite low, a fact which has led to the use of mold-filling procedures in which the beads are introduced into a swirling airstream by aspirator action and carried into the mold. An automatic mold-filling device operating on this principle is disclosed and claimed in application for U.S. Letters Patent, Serial No. 190,519, filed April 16, 1962, now abandoned.

The filled mold is subjected to carefully controlled heating, usually by means of superheated steam circulated in a jacket on the mold. At suitable temperatures, around 180° F., the individual beads soften, complete their expansion, and merge together to form an effectively monolithic, smooth-surfaced mass, free of any perceptible voids or pores, i.e., is not sponge-like in appearance. Nevertheless, each individual expanded bead making up the mass is internally cellulated so that, despite an absence of apparent porosity, its bulk density is very low. Consequently, the foamed material is an excellent thermal insulator and combines lightness of weight with reasonable strength and rigidity.

Ironically, it is the inherent nature of the foam molding process and many of the features which set it apart from other, more conventional molding methods and endow its many advantages that have proven the stumbling block to a solution of the problem outlined hereinabove. Thus, it is ordinarily a simple matter to cast small objects from a fusible material, i.e., where the mold charge is molten and solidifies on cooling; strip molds are employed containing individual cavities for a large number of pieces interconnected with the filling aperture by means of grooves or passages. The sprue and the charge material remaining and solidifying in such grooves and passages are remelted and reused in succeeding charges; this prevents the operation from being unduly costly in terms of waste material.

In foam molding, however, such a procedure is not practicable for several reasons. Aside from the fact that the sprues, themselves are objectionable because their removal irreperably blemishes foam plastic articles, they constitute a serious economic disadvantage because they cannot be reclaimed; consequently, the use of multiple cavity molds of the conventional type is substantially unknown in commercial foam molding.

Furthermore, as will be appreciated from the foam molding process described above, it is not feasible to use a plurality of individual molds for small articles due to the complexity of the process as a whole and the mold-filling phase in particular. For automatic operation, each individual mold would require a mold filler of its own; otherwise, each mold would need to be filled and plugged manually. The savings in equipment costs of the latter alternative would be more than offset by increased labor costs and reduced production rate. Moreover, the steam and cooling jackets and other complicating features of foamed plastic molds renders them much more expensive than molds used in casting molten material, another factor militating against the use of individual molds for the production of small objects salable only at low cost.

It is, therefore, the fundamental object of the present invention to provide a novel molding apparatus and method which overcomes entirely or mitigates at least one of the problems of the prior art as outlined above.

A more specific object is the provision of an improved molding assembly and method which render economically practical the production of small objects molded from expandable plastic beads.

Another object is to enable the use of multiple-cavity molds in foam molding processes and apparatus.

A further object is the provision of a novel strip molding method and apparatus which enables the production of foamed plastic articles unblemished by sprue-removal scars.

Still another object is the provision of multiple-cavity molds having no grooves or passages for the interconnection of the multiple cavities.

A further object is the provision of a foam molding method and apparatus which enable filling all cavities of a strip mold with a single automatic blow-filler device.

To the fulfillment of these and additional objects, the invention contemplates a molding apparatus comprising a multiple-cavity mold made up of two mold sections having complementary mating surfaces. Each of the mold portions contains a plurality of depressions in the mating surface, respective depressions of each mold section coacting to form a plurality of fully enclosed individual mold cavities mutually isolated from one another and each conforming in shape to an object to be molded therein. The depressions in each of the mold sections are so spaced and arranged with respect to each other and to the depressions on the other mold section that relative displacement of the mold sections by a predetermined amount along the mating surfaces places the depressions in flow intercommunication whereby a flowable molding charge may be introduced directly into one of the depressions and flow progressively into each adjacent depression until all are filled.

In accordance with its method aspects, the invention contemplates filling a two-part, multiple-cavity mold having a plurality of normally-unconnected, uniformly-spaced mold cavities formed by registration of complementary depressions in respective mating surfaces of the two parts of the mold, by the following sequence of steps: displacing the mold parts relative to one another along the one axis until each pair of adjacent depressions in the mating surface of one of the mold parts is interconnected by depressions in the mating surface of the other mold part; introducing continuously into one of the depressions, and via the interconnecting depressions to all depressions, an air current carrying a molding material in particulate form until all recesses are filled with the molding material; displacing the mold parts relative to one another until the depressions in the respective parts register to form unconnected mold cavities; and subjecting the filled mold to molding conditions.

The advantages of the invention, its further objects, scope and the manner in which it may be practiced will be more fully apparent to persons conversant with the art to which it pertains from the following description of an exemplary embodiment thereof taken in conjunction with the subjoined claims and the annexed drawings wherein like parts are designated by like reference numerals throughout the several views and FIGURE 1 is a vertical sectional view of an assembled, two part mold embodying the invention as it appears during filling;

FIGURE 2 is a top plan view of the lower section of the mold assembly of FIGURE 1 as indicated by line 2—2 therein; and FIG. 3 is a view similar to FIGURE 1 with the mold completely filled and closed.

Referring now to the drawings, a two-part mold 10 in assembled condition is shown in FIGURES 1 and 3 and is made up of two elongated mating sections 12 and 14. In the illustrated embodiment, each mold section 12, 14 has a planar surface 16, 18, respectively, each containing a lengthwise row of hemispherical depressions 20a, 20b, 20c, 20d and 22a, 22b, 22c, 22d spaced so as to register and form spherical mold cavities A, B, C, D when the mold is assembled with surfaces 16 and 18 in confronting relation and closed as shown in FIGURE 3.

While for ease of illustration a mold for spherical objects has been shown and will be described by way of example, it will be understood that the principles of the present invention are applicable to molds for articles of any configuration not intrinsically repugnant thereto. Moreover, while the mating surfaces 16, 18 of the mold sections are planar and define a parting plane which intersects the mold cavities at the locus of their greatest lateral dimension (along a great circle in the case of a sphere) neither of these conditions is indispensible, although both are convenient and preferred. The mating surfaces, however, must be rectilinear at least in the direction of the row of depressions, which usually coincides with the length, so that they can be translated relative to one another in such direction without interference. Thus, for example, mating surfaces 16 and 18 may be of complementary arcuate configuration in a section taken perpendicular to the plane of the drawing as long as these surfaces are rectilinear in all sections taken parallel to the row of depressions.

An additional requirement is that distance D between adjacent recesses must be substantially less than the dimension of the recesses along the axis of the row at the parting plane for reasons which will become apparent as this description proceeds. It should be understood that the invention contemplates mold sections in which the depressions are spaced along an arcuate path and that, as used herein and in the subjoined claims, such terms as "axis" and "direction" are to be construed, unless limited by context, to encompass the arcuate as well as the linear case.

By reference to FIGURE 2, it will be seen that the mating surface 18 of the lower mold section 14 is continuous, i.e., free of grooves, notches or other interruptions, around and between all of the cavity-forming depressions. The same is true of the mating surface 16 of the upper mold section 12, which is not shown in plan view but in this and most respects is a mirror image of FIGURE 2.

Lower mold section 14 differs from the upper section in that it contains a filling passage 24 which terminates in a square port 24a in surface 18 at one end of the mold section, adjacent depression 22a. While it is conceivable that filling passage 24 and port 24a might be located along the sides of the mold section—most likely midway between its ends—the location shown is preferred and has been found to give entirely satisfactory results.

As appears in FIGURES 1 and 3, filling port 24 connects with the inner end of a threaded opening 26 in the end wall 28 of mold section 14. Opening 26 is adapted to receive a mold filling device of the type described in the aforementioned application Serial No. 190,519 and schematically shown at 30. Mold fillers of this type inject the mold charge, consisting of the pre-expanded beads carried and propelled by a stream of air as previously described. The particular filling device disclosed in the above-mentioned application is automatic in its operation, terminating the flow of beads when the mold is filled, purging itself of overfill beads, and plugging the mold. While this particular filling device is preferred, any type of filler which operates in the same general manner may be used.

The wall of filling passage 24 opposite opening 26 is sloped so as to deflect the incoming mold charge upwardly through port 24a.

Each of the mold sections 12, 14 is of shell-type construction and is formed with a continuous peripheral skirt 32, 34, respectively, extending away from the mating surfaces. Cover plates 36, 38 secured to the edges of the respective skirts, as by threaded fasteners 40 coact with the skirts to define steam chambers 42, 44 around the undersides of the mold depressions. Suitable packing 46 disposed in a groove in the skirt edges, seals the cover plates against leakage. Steam inlets and drain connections, not shown, are provided for use in heating the mold in the conventional manner.

In actual practice mold sections 12, 14 would ordinarily be used in conjunction with an automatic molding press, not shown; accordingly, the external physical configuration of the mold sections would be appropriate to permit installation in such a press. Moreover, the press would embody controls and connections for supplying steam, draining condensation, circulating coolant and injecting the mold charge, as well as means for manipulating the mold sections, i.e., "cracking" the mold (separating the mold sections at the parting plane by a few thousandths of an inch during charge injection) and opening the mold entirely to enable removal of the completed articles. All of these features of the molding press may be of conventional design and construction, well-known in the art. In accordance with the present invention, the press would also embody a pneumatic, hydraulic, or other suitable actuator means for effecting relative, translational displacement of the mold sections parallel to the parting plane and length of the row of depressions between the positions shown in FIGURES 1 and 3 wherein such an actuator is diagrammatically represented at 44. The particulars and significance of the two positions will become apparent as this description proceeds.

Notwithstanding what has been stated with respect to the utilization of an automatic press, the novel method of filling a mold contemplated by the present invention does not necessarily entail the use of such equipment; it may be accomplished manually as will become apparent from the following description of the method. The mold sections are assembled in the manner already explained and one section is displaced relative to the other along the parting plane until all of the depressions in one section are interconnected via respective offset depressions in the other section, thus forming a continuous serpentine passage through the mold from the filling port to the most remote depression.

With the mold sections thus displaced and cracked, a stream of air or other gas, carrying pre-expanded polystyrene beads, is caused to flow through the serpentine passage. The beads are carried to the most remote depression where, enable to escape with the gas vehicle through the space between the mating surfaces provided by "cracking," they accumulate until the recess is entirely filled whereupon the beads begin to accumulate in the next preceding recess, and then the next, and so forth. The filling progresses toward the inlet port until all recesses are entirely filled with beads at which time injection of further charge is terminated. If a filling device of the type described in the aforementioned. If a filling device of the type described in the aforementioned application Serial No. 190,519 is used, filling is automatically terminated at this point.

The filling port is then plugged, manually or by operation of the automatic filling device if used, and the mold sections displaced along the parting plane until all recesses of one section register with respective recesses of the other section to form individual mold cavities. The mold sections are then pressed together to bring the mating surfaces into engagement and the closed mold subjected to conventional molding steps to form the desired articles.

Both the filling and closing steps of the method, as well as the ensuing molding operations, are performed automatically where a suitable molding press is utilized, displacement of the molds being accomplished by the press controls. No further separate description of the operation of the apparatus aspects of the invention is deemed necessary.

In the illustrated embodiment of the invention, venting of the charge of propellant gas has been described as being accomplished by "cracking" of the mold, which is standard practice in the use of single cavity molds. However, it may be desirable to provide vent ports for this purpose to be used in lieu of, or in conjunction with cracking. In normal practice, single and multiple cavity molds are often pierced or slotted in the cavity depressions or recesses in order to facilitate the entrance of steam and displacement of entrapped air. A sufficient number of these holes or vents permits the propellant air used in charging the mold to escape through the cavity wall and thus eliminate the necessity of cracking.

While there has been described what at present is believed to be the preferred embodiment of this invention, it will be obvious to those skilled in the art that various changes and modifications may be made therein without departing from the inventive concept; it is aimed, therefore, to cover in the appended claims all such changes and modifications as fall within the true spirit and scope of the invention.

What is claimed and desired to be covered by Letters Patent of the United States is:

1. Molding apparatus comprising a multiple-cavity mold made up of two mold sections having complementary surfaces disposed in confronting relation, said surfaces being rectlinear in the direction of at least one dimensional axis and each containing a plurality of depressions simultaneously registerable to form a plurality of fully-enclosed, individual mold cavities mutually isolated from one another and so spaced and arranged that relative translational displacement of said mold sections by a predetermined amount along said axis places said recesses in flow intercommunication, whereby a flowable mold charge may be introduced directly into one of said recesses and flow progressively into each adjacent recess until all are filled; and means mounting said mold sections with said surfaces in confronting relation for such translational displacement relative to one another between a position in which said recesses are in registration and an alternate position in which said recesses are offset by said predetermined amount.

2. The combination defined in claim 1, including means mounted on one of said mold sections for injecting into one of said recesses a gas-propelled mold charge of expandable plastic beads.

3. The combination defined in claim 2, including means for separating the confronting surfaces of the mold sections by an amount smaller than the diameter of said plastic beads during operation of said injecting means.

4. Molding apparatus comprising a multiple-cavity mold made up of two mold sections having planar mating surfaces disposed in confronting relation, each of said mold sections containing a plurality of depressions in said planar surfaces, a plurality of respective depressions in said planar surfaces being simultaneously registerable to form fully-enclosed individual mold cavities mutually isolated from one another, the depressions in each of said mold sections being so spaced and arranged with respect to each other and the depressions in the other mold section that relative displacement of said mold sections parallel to said mating surfaces by a predetermined amount from a position in which said respective depressions are in registration, places said depressions in flow intercommunication, whereby a flowable mold charge may be introduced directly into one of said cavities and flow progressively into each adjacent cavity until all are filled; and means mounting said mold sections with said surfaces in confronting relation for such relative displacement.

5. A multiple cavity mold made up of two elongate sections having planar mating surfaces disposed in confronting relation and each containing at least one longitudinally extending row of spaced depressions, a plurality of respective adjacent depressions in each mold section being simultaneously registerable to form a longitudinally extending row of fully-enclosed, mold cavities mutually isolated from one another, the depressions in each of said mold sections being so spaced with respect to each other and to the depressions on the other section that relative translational displacement of said mold sections parallel to said mating surfaces by a predetermined amount from a position in which said respective depressions are in registration, places said depressions in flow intercommunication, whereby a flowable mold charge may be introduced directly into one of said cavities and flow progressively into each adjacent cavity until all are filled; and means mounting said mold sections with said surfaces in confronting relation for such relative displacement.

6. A multiple-cavity mold in accordance with claim 5, including a filling passage at one end of one of said mold sections terminating in a port in the planar surface of said section at a point adjacent the endmost depression therein.

7. In combination, foam molding apparatus comprising:
- a multiple-cavity mold made up of two similar, elongated sections, each including a planar surface containing a longitudinally-extending row of spaced depressions, the respective planar surfaces and depressions being adapted for registration to form a plurality of fully-enclosed, spaced, mold cavities mutually isolated from one another;
- means for mounting said mold sections with said planar surfaces in confronting relation;
- means operative upon said mounting means to longitudinally translate said mold portions relative to one another between one position in which said depressions are in flow intercommunication and a second position in which said depressions are in registration; and
- means operative to inject a mold charge into said mold while said mold sections are in said one position.

8. The combination defined in claim 7 including means, operative upon said mounting means, to move said mold sections in a direction perpendicular to said planar surfaces between one position in which said planar surfaces are in abutment and a second position wherein said planar surfaces are spaced by a distance in the order of a few thousandths of an inch.

9. Molding apparatus in accordance with claim 1, in combination with means for injecting into said one cavity a mold change consisting essentially of expandable plastic head.

References Cited
UNITED STATES PATENTS

| | | | |
|---|---|---|---|
| 1,505,816 | 8/1924 | Steele | 249—119 |
| 2,250,697 | 7/1941 | Bassett | 264—124 |
| 2,578,361 | 12/1951 | Kappel | 249—119 |
| 2,890,485 | 6/1959 | Knowles | 18—5 XR |
| 3,009,203 | 11/1961 | Polete | 18—30 |
| 3,029,472 | 4/1962 | Fischer | 18—30 |
| 3,034,177 | 5/1962 | Hopper | 18—40 XR |
| 3,058,162 | 10/1962 | Grabowski | 264—53 |
| 3,144,683 | 8/1964 | Vogt | 18—30 |
| 3,150,025 | 9/1964 | Stayter et al. | 264—123 XR |
| 3,159,694 | 12/1964 | Wiles et al. | 264—53 |
| 3,221,366 | 12/1965 | Couchman | 18—5 |

WILLIAM J. STEPHENSON, *Primary Examiner.*

ALEXANDER H. BRODMERKEL, EUGENE MAR,

P. E. ANDERSON, *Assistant Examiners.*